/ Patented Feb. 10, 1953

2,628,216

UNITED STATES PATENT OFFICE 2,628,216

PROCESS FOR PREPARING POLYAMIDES FROM DINITRILES AND DISECONDARY ALCOHOLS OR THEIR ESTERS

Eugene Edward Magat, Wilmington, Del., assignor to E. I. du Pont de Nemours & Company, Wilmington, Del., a corporation of Delaware No Drawing. Application January 25, 1949, Serial No. 72,771

9 Claims. (Cl. 260—78)

This invention relates to a novel process for the preparation of synthetic linear polyamides, which polyamides are suitable for preparation of filaments, fibers, yarns, fabrics, films and the like. The present invention is particularly directed to a new method for making the fiber-forming polyamides described in U. S. Patents 2,071,250 and 2,130,948.

Synthetic linear polyamides of high enough molecular weight to be useful for textile purposes are generally difficult to prepare. One of the main difficulties resides in the fact that very high temperatures and critical pressure conditions are necessary during the polymerization process. For example, when a representative polyamide, such as polyhexamethyleneadipamide, is prepared, a polymerization time up to four or five hours at temperatures in the vicinity of 275° C. and pressures up to and including 250 p. s. i. may be necessary. Such a process, because of the heavy equipment, high temperatures and the like, must of necessity be rather expensive and, therefore, it is obvious that if polyamides could be prepared at room temperature without such special processing conditions, a much cheaper polymerization process could be realized placing polyamides on a better economic footing.

An object of this invention therefore is to provide a simple and economical process for preparing filament-, and film-forming synthetic linear polyamides.

Another object is to prepare synthetic linear polyamides by a polymerization reaction carried out at substantially room temperature in contradistinction to the high temperatures (180–300° C.) and, hence, expensive polymerization reaction required to form linear polyamides by the processes of the prior art. These and other objects will more clearly appear hereinafter.

The objects above stated are realized by this invention which, briefly stated, comprises reacting an organic dinitrile with a compound selected from the group consisting of alcohols and disecondary carboxylic acid esters of disecondary alcohols containing as the sole reacting groups alcohol and ester groups, in the presence of a strong acid catalyst. After the reaction has proceeded for a length of time sufficient to form a polymer of the desired high molecular weight, a polymer, which has the characteristic recurring group of a polyamide, may be isolated by precipitation with water followed by neutralization, filtration and drying. This product may then be melt-, dry- or wet-spun or cast to form filaments, fibers, films, etc. by processes well-known in the art.

The principle of this new reaction is exhibited by the following general equations and formulae, wherein the catalyst is a strong acid, R and Z are divalent organic radicals free of reacting groups, R′ and R″ are monovalent organic radicals free of reacting groups, and $n$ is any whole number.

(1) $(n+1)\text{NC}-\text{R}-\text{CN} + (n+1)\text{HO}-\text{CHR}'-\text{Z}-\text{CHR}'-\text{OH}$ 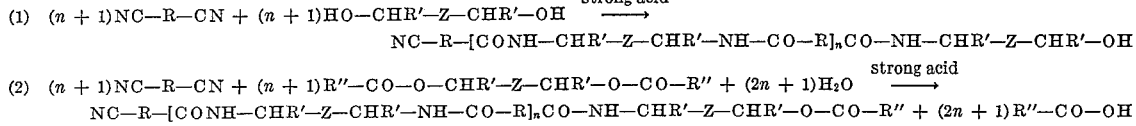

$\text{NC}-\text{R}-[\text{CONH}-\text{CHR}'-\text{Z}-\text{CHR}'-\text{NH}-\text{CO}-\text{R}]_n\text{CO}-\text{NH}-\text{CHR}'-\text{Z}-\text{CHR}'-\text{OH}$ (2) $(n+1)\text{NC}-\text{R}-\text{CN} + (n+1)\text{R}''-\text{CO}-\text{O}-\text{CHR}'-\text{Z}-\text{CHR}'-\text{O}-\text{CO}-\text{R}'' + (2n+1)\text{H}_2\text{O}$ $\xrightarrow{\text{strong acid}}$ $\text{NC}-\text{R}-[\text{CONH}-\text{CHR}'-\text{Z}-\text{CHR}'-\text{NH}-\text{CO}-\text{R}]_n\text{CO}-\text{NH}-\text{CHR}'-\text{Z}-\text{CHR}'-\text{O}-\text{CO}-\text{R}'' + (2n+1)\text{R}''-\text{CO}-\text{OH}$ The operable dinitriles may be formulated as NC—R—CN, in which R is a bivalent organic radical, preferably selected from the groups consisting of bivalent hydrocarbon radicals and bivalent heterocyclic radicals, or is non-existent as in the case of cyanogen. The bivalent radical joining the nitrile groups may be aliphatic or aromatic, cyclic or heterocylic, saturated or unsaturated and may be unsubstituted or substituted by groups which do not interfere with the linear polymer-forming reaction. Thus, the dinitrile may contain primary alcohol and other unreactive groups, for example primary ether, sulfide, ketone, ester of primary alcohol, amide, halogen and the like. Specific suitable dinitriles by way of example are the following: malononitrile, succinonitrile, glutaronitrile, adiponitrile, pimelonitrile, suberonitrile, azelonitrile, sebaconitrile, isophthalonitrile, phthalonitrile, 1,8-naphthalodinitrile, hexahydroterephthalonitrile, beta-phenyl adiponitrile, beta-methyl adiponitrile, 4-ketopimelonitrile, 3-nitrophthalonitrile, 1,4-dicyanobutene-2. Preferably the radical joining the nitrile groups is a bivalent hydrocarbon radical. A mixture of two or more dinitriles may be used if copolymers are desired.

Disecondary alcohols and esters having no other functional group reactive under the conditions of this reaction are, in general, suitable for reaction with the dinitriles as described previously to produce synthetic linear polyamides. The reason for restricting this definition to disecondary esters and disecondary glycols having no other functional groups is obvious if a linear polyamide is desired, since other functional groups would tend to induce cross-linking to give a resultant cross-linked polymeric material that would be infusible and insoluble. As suitable examples of glycols operative in the process of this invention may be mentioned 2,7-dihydroxyoctane; 2,11-dihydroxydodecane; 1,4-bis(3'-hydroxybutyl) benzene. As suitable examples of operative diesters we may cite the various acid esters of the above alcohols. Here again, copolymers may be prepared by using two or more glycols and/or diesters.

An alternative group of related reactants suitable for making polyamides comprises the cyanoalcohols and the cyano-esters. Here again it is necessary that the alcohol or ester be secondary. With this class of reactants, a self-condensation occurs under the conditions of the process of this invention and a polyamide is formed. As some examples of suitable cyano-alcohols, there may be mentioned the following: 2-hydroxy-6-cyanohexane, 2-hydroxy-9-cyanononane, 3-hydroxy-8 - cyanooctane, p-(3-hydroxybutyl)benzonitrile, and 2 - hydroxy - 8 - cyano-6-oxaoctane. Representative cyano-esters may be easily obtained by the reaction of any of the above cyano-alcohols with acid chlorides, e. g., acetyl chloride to form the corresponding acetates. Of course, it will be realized that other suitable esterification procedures well known in the art may be used.

It is preferred to carry out the subject reaction under anhydrous or substantially anhydrous conditions. The reactant mixture may then be poured into water to separate the polymeric material, after which the steps of neutralization and purification may be followed.

It is preferable to use a 1:1 mol ratio within ±10% of dinitrile and glycol or diester if a relatively long-chain polymeric product is desired. If a higher ratio of one or the other is present, the excess constituent tends to serve as a diluent and polymerization is restricted, since each embryonic polymeric molecule can only grow to the extent of availability of the component present in the smaller amount.

It has been found, in general, that strong acids are useful as catalysts for the process of this invention. Examples of suitable acids are sulfuric acid, phosphoric acid, alkane sulfonic acid, or a mixture of various acids, such as a mixture of sulfuric and phosphoric acids. The acid catalyst may very conveniently be used as the reaction medium.

In general, it is not necessary to heat the reagents since the reaction usually takes place spontaneously with more or less evolution of heat. In some cases, however, where less active reactants are employed, heating may well be advantageous. The reaction may be carried out in the range of $-20°$ C. or lower up to $80°$ C. or higher, with the optimum range $20°$ C. to $40°$ C. preferred. External cooling of the reaction mixture may be employed where volatile reactants are used or the nature of the reactants is such that external cooling is needed to keep the temperature below about $80°$ C.

The time of reaction required has been found to vary somewhat according to the particular glycol, diester or dinitrile used, although a few hours are sufficient to substantially complete the reaction in most cases. The particular acid medium in which a reaction takes place may also increase or decrease the time necessary for a complete reaction. In some cases a very short period, about an hour or less, is sufficient, although in the case of less reactive ingredients, this time of reaction may run up to as much as one or two days or more.

The order in which the reactants are mixed is not important and may be varied to suit the particular case in hand. It has been found advantageous, however, in most cases to mix or dissolve the glycol or diester in the dinitrile first and then add this mixture to the acid solvent. This, however, is not an essential step in the process and merely constitutes a convenient method for adding the reactants in equivalent amounts. It will normally not be necessary to use an additional solvent, since many glycols and diesters form a compatible solution with dinitriles and dissolve in each other completely.

It is preferred that the concentration of the reactants in the acid catalyst be rather low so that rate of reaction will not be too fast and cause gelation before the reactants have been completely added to the acid. Concentration of the reactants in the acid may be from 2 to 40% by weight based on the total weight of the reaction mixture, with the range 10 to 20% preferred.

Polyamides of this invention may be prepared in reactors constructed of or lined with glass, porcelain, enamel, silver, gold, platinum, etc., the main requirement being, of course, that the acid used in the catalyst should not react with the reactor material. This is rather important since certain metal salts have a tendency to produce colored polymeric product and may, in fact, inhibit the reaction.

The properties of a given polyamide, of course, will vary over a considerable range depending upon the molecular weight. Average molecular weights of the polyamides are very difficult to determine because of their limited solubility in suitable solvents. However, since intrinsic viscosity gives an indication of the degree of polymerization, it is to be used hereinafter as a measure thereof. It suffices to say that, in general, the process of this invention is capable of producing polyamides having intrinsic viscosities varying from 0.1 up to 2.5 or higher which comprehend polyamides of filament- and film-forming ability.

The expression "intrinsic viscosity" denoted by the symbol $(\eta_0)$, used herein as a measure of the degree of polymerization of the polyamide, is defined as follows:

$$\frac{\ln (\eta_r)}{C} \text{ as } C \text{ approaches } 0$$

wherein $(\eta_r)$ is the viscosity of the solution of the polyamide in meta-cresol divided by the viscosity of meta-cresol per se measured in the same units at the same temperature, and C is the concentration in grams of the polyamide per 100 cc. of solution.

The following examples wherein are set forth preferred embodiments further illustrate the principles and practice of this invention. Parts are by weight unless otherwise indicated.

*Example I*

A solution of 1.08 parts (0.01 mol) adiponitrile and 2.02 parts (0.01 mol) 1,10-dimethyl-decanediol-1, 10 having the formula:

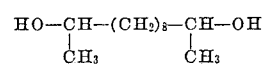

is added to 9.2 parts of concentrated $H_2SO_4$. The reaction is exothermic. The reaction is allowed to continue for two days at room temperature. The viscous solution is then poured into water and the acid neutralized. A putty-like material is obtained. This polymer is capable of being melt-spun to form fibers.

Example II

A reactant solution is prepared by dissolving 0.54 part (0.005 mol) of terephthalonitrile, 1.01 parts (0.005 mol) of 1,10-dimethyldecanediol-1,10 in 9.2 parts of concentrated $H_2SO_4$. The polymerization is allowed to continue with cooling for 24 hours by the end of which time the reactant solution becomes very viscous. The solution is then poured into water and the polymer separates as a fine, powder-like material which can be melt-spun to silky fibers.

Example III

A mixture of 2.06 parts of 1,4-bis(3'-hydroxybutyl) benzene (0.01 mol) and 1.08 parts of adiponitrile (0.01 mol) is dissolved in 9.2 parts of concentrated $H_2SO_4$. The reaction mixture is maintained at 30° C. by cooling and after 24 hours it is transferred into water. The polymer is isolated as a fine powder.

Example IV

A solution of 2.86 parts of the diacetate of the glycol 1,10-dimethyldecanediol-1,10 (0.01 mol) and 1.08 parts of adiponitrile (0.01 mol) in 9.2 parts of concentrated $H_2SO_4$ is allowed to stand at room temperature for 24 hours. After addition of water, a polymer is isolated which is similar to the one prepared from the glycol in Example I.

Example V

A mixture of 1.43 parts of the diacetate of the glycol 1,10-dimethyl-decanediol-1,10 (0.005 mol), 1.01 parts of terephthalonitrile (0.005 mol) and 9.2 parts of concentrated sulfuric acid are reacted under the conditions of Example II. The resulting polymer is similar to the product of Example II.

Copolyamides may be easily prepared by the process of this invention simply by the expedient of using two or more dinitriles with a single glycol or diester, or again by using a multiplicity of glycols or diesters with a nitrile plus any combination of these reactants. In general, such copolyamides have lower melting points than the simple polyamides but their physical properties are still such that they are eminently useful for application in the textile, film and coating arts. Their wider solubility characteristics and lower melting points give them certain obvious advantages for specialized uses.

The fiber-forming linear polyamides resulting from the process of this invention can be spun into continuous filaments in a number of ways. One method of spinning (wet process) consists in dissolving the polyamide in a suitable solvent and extruding the resultant solution through orifices into a liquid which dissolves the solvent but not the polyamide, and continuously collecting the filaments thus formed on a suitable revolving drum or spindle. Another method (dry process) consists in extruding a solution of the polyamide into a chamber (which may be heated) where the solvent is removed by evaporation. Still another method (melt process) consists in extruding the molten polyamide through orifices into a suitable atmosphere where it congeals to a filament. In these various methods of spinning, the fiber-forming mass may be forced through the orifices by means of gas pressure or by means of a constant volume delivery pump. By similar processes known to the art the polyamides can be formed into rods, bristles, sheets, foils, ribbons, films and the like. In the various methods of forming shaped articles from fiber-forming polyamides and particularly when this is done from solutions of the polymers, the characteristics of the filaments, etc. may be altered by blending the polyamides with other polyamides, such as polyhexamethylene adipamide, or with resins, plasticizers, cellulose derivatives, etc. As cellulose derivatives which can be blended with the polyamide solutions might be mentioned ethyl cellulose, benzyl cellulose, cellulose acetate, etc.

As described above, many of the polyamides of this invention may be formed into filaments, fibers and the like by the process known in the art as melt spinning. However, in the case of certain polyamides which may have melting points of 300° C. and higher, it is frequently not feasible or economical to spin at such high temperatures. When it is desired to form polymers of this type into shaped articles, it will normally be found advantageous to use the dry or wet spinning techniques. As examples of solvents which may be used to advantage in either one or both of these spinning techniques, the following may be mentioned: meta-cresol, phenol, chloral hydrate, formic acid, sulfuric acid, ethyl alcohol, alcohol/chloroform mixtures, etc.

The advantages to be derived from the practice of this invention are obvious. Low temperature polymerization simplifies the equipment and gives rise to substantial savings in operation and in plant investment. An advantage of great importance too resides in the fact that the polymeric products resulting from the process of this invention are obtained directly in the finely divided state which obviates the necessity of the usual casting and grinding with their attendant expense and difficulties.

As many widely different embodiments may be made without departing from the spirit and scope of this invention it is to be understood that the invention is to be in no wise restricted save as set forth in the appended claims.

I claim:

1. A process for producing synthetic linear polyamides which comprises reacting within the temperature range of −20° to 80° C. an organic dinitrile free of other reacting groups with a substantially mol equivalent of a disecondary compound selected from the group consisting of disecondary alcohols and carboxylic acid esters of disecondary alcohols containing as the sole reacting groups alcohol and ester groups, in a substantially anhydrous strong acid reaction medium, said acid being selected from the group consisting of sulfuric acid, phosphoric acid, alkane sulfonic acid and mixtures thereof, and continuing the reaction within said temperature range until a polymer of the desired intrinsic viscosity is produced.

2. The process of claim 1 wherein the reaction is carried out at a temperature of from 20° to 40° C.

3. A process for producing synthetic linear polyamides which comprises reacting within the temperature range of −20° to 80° C. substantially equal molecular proportions of an organic dinitrile free of other reacting groups and a disecondary alcohol containing hydroxyls as the sole reacting groups in a substantially anhydrous reaction medium consisting of a strong acid selected from the group consisting of sulfuric acid, phosphoric acid, alkane sulfonic acid and mixtures thereof, the total concentration of said dinitrile and said disecondary compound being within the range of 2% to 40% by weight, and continuing the reaction within said temperature range until a polymer of the desired intrinsic viscosity is produced.

4. The process of claim 3 wherein the total concentration of said dinitrile and said disecondary compound is within the range of 10% to 20% by weight.

5. The process for producing a synthetic linear polyamide which comprises reacting within the temperature range of −20° to 80° C. adiponitrile with a substantially mol equivalent of 1,10-dimethyldecanediol-1,10 in a substantially anhydrous strong acid reaction medium, said acid being selected from the group consisting of sulfuric acid, phosphoric acid, alkane sulfonic acid and mixtures thereof, and continuing the reaction within said temperature range until a polymer of the desired intrinsic viscosity is produced.

6. The process for producing a synthetic linear polyamide which comprises reacting within the temperature range of −20° to 80° C. terephthalonitrile with a substantially mol equivalent of 1,10-dimethyldecanediol-1,10 in a substantially anhydrous strong acid reaction medium, said acid being selected from the group consisting of sulfuric acid, phosphoric acid, alkane sulfonic acid and mixtures thereof, and continuing the reaction within said temperature range until a polymer of the desired intrinsic viscosity is produced.

7. The process for producing a synthetic linear polyamide which comprises reacting within the temperature range of −20° to 80° C. adiponitrile with a substantially mol equivalent of 1,4-bis-(3'-hydroxybutyl)benzene in a substantially anhydrous strong acid reaction medium, said acid being selected from the group consisting of sulfuric acid, phosphoric acid, alkane sulfonic acid and mixtures thereof, and continuing the reaction within said temperature range until a polymer of the desired intrinsic viscosity is produced.

8. The process for producing a synthetic linear polyamide which comprises reacting within the temperature range of −20° to 80° C. adiponitrile with a substantially mol equivalent of the diacetate of 1,10-dimethyldecanediol-1,10 in a substantially anhydrous strong acid reaction medium, said acid being selected from the group consisting of sulfuric acid, phosphoric acid, alkane sulfonic acid and mixtures thereof, and continuing the reaction within said temperature range until a polymer of the desired intrinsic viscosity is produced.

9. The process for producing a synthetic linear polyamide which comprises reacting within the temperature range of −20° to 80° C. terephthalonitrile with a substantially mol equivalent of the diacetate of 1,10-dimethyldecanediol-1,10 in a substantially anhydrous strong acid reaction medium, said acid being selected from the group consisting of sulfuric acid, phosphoric acid, alkane sulfonic acid and mixtures thereof, and continuing the reaction within said temperature range until a polymer of the desired intrinsic viscosity is produced.

EUGENE EDWARD MAGAT.

REFERENCES CITED

The following references are of record in the file of this patent:

UNITED STATES PATENTS

| Number | Name | Date |
|---|---|---|
| 2,071,250 | Carothers | Feb. 16, 1937 |
| 2,317,155 | Coffman et al. | Apr. 20, 1943 |
| 2,448,991 | Lichty | Sept. 7, 1948 |